(12) United States Patent
Takigahira

(10) Patent No.: US 7,905,494 B2
(45) Date of Patent: Mar. 15, 2011

(54) MECHANICAL SEAL DEVICE

(75) Inventor: Yoshiaki Takigahira, Tokyo (JP)

(73) Assignee: Eagle Industry Co., Ltd., Tokyo (JP)

( * ) Notice: Subject to any disclaimer, the term of this patent is extended or adjusted under 35 U.S.C. 154(b) by 400 days.

(21) Appl. No.: 11/996,427

(22) PCT Filed: Jul. 7, 2006

(86) PCT No.: PCT/JP2006/313567
§ 371 (c)(1),
(2), (4) Date: Jan. 22, 2008

(87) PCT Pub. No.: WO2007/010761
PCT Pub. Date: Jan. 25, 2007

(65) Prior Publication Data
US 2009/0249865 A1    Oct. 8, 2009

(30) Foreign Application Priority Data

Jul. 22, 2005  (JP) ................................. 2005-213058

(51) Int. Cl.
*F16J 15/34* (2006.01)
*F16J 15/36* (2006.01)
(52) U.S. Cl. ......................................... 277/371; 277/393
(58) Field of Classification Search .................. 277/393, 277/370–371, 397
See application file for complete search history.

(56) References Cited

FOREIGN PATENT DOCUMENTS

| JP | 194668 | 12/1985 |
|---|---|---|
| JP | 60194668 | * 12/1985 |
| JP | 160369 | 10/1986 |
| JP | 61160369 | * 10/1986 |
| JP | 64004953 | * 1/1989 |
| JP | 50766 | 4/1992 |

* cited by examiner

*Primary Examiner* — Vishal Patel
(74) *Attorney, Agent, or Firm* — Arent Fox LLP

(57) ABSTRACT

A mechanical seal device capable of preventing a sealing ability from being lowered by the irregular displacement of the seal surface of a sealing ring and by the deterioration of a packing for sealingly fitting the sealing ring by heat generated due to its slidable contact with the sealing ring. The mechanical seal device comprises the rubberlike elastic material annular packing having a joining face fitted peripheral surface (inner peripheral surface) of a stepped hole and an adhesive face on the inner peripheral side of the joining face and having an insertion tip part at its insertion tip inserted into the fitting peripheral surface and the sealing ring for fixing having a fitting surface joined to the adhesive face of the packing, a rear surface fitted to the support face (bottom face) of the stepped hole, and a seal surface on the opposite side of the rear surface. With the rear surface joined to a support surface, a space part is formed between the insertion tip part and the opposite surface thereto on the support surface side. The packing is inserted into the space part to fit the rear surface onto the support face by the elastic force of the packing.

9 Claims, 13 Drawing Sheets

US 7,905,494 B2

MECHANICAL SEAL DEVICE

CROSS-REFERENCE TO RELATED APPLICATION

This application is a National Stage entry of International Application No. PCT/JP2006/313567, filed Jul. 7, 2006, the entire specification claims and drawings of which are incorporated herewith by reference.

TECHNICAL FIELD

The present invention relates generally to a mechanical seal device which is able to provide a seal for a sealed fluid under high pressure or varying pressure and exhibit an outstanding seal performance of sliding seal surfaces by means of a secure installation of a seal ring assembly. The present invention also relates to a mechanical seal device for preventing disfunctioning of the sliding seal surfaces due to a heat generation during sliding movement of the seal rings.

BACKGROUND ART

As a sealed fluid under varying pressure or high pressure is more frequently applied to machineries in recent years, how to reduce a leak amount of the sealed fluid in the mechanical seal device draws more attentions. Leak of the sealed fluid which is caused by the way of the mechanical seal device being installed has been a major concern. In particular, a leak of the sealed fluid from a pair combination of the seal rings is caused by an installation structure of a gasket which provides a seal between the mating surfaces of the installation gap which is created when one of the seal rings is installed in a seal housing. Especially a complex displacement may occur to the seal surface of the seal ring which is retained by a gasket which is made of rubber-like elastic material when it is subjected to high pressure or varying pressure of the sealed fluid. For example, in order to provide a seal between the seal housing and one member of the seal rings which is mounted relative to the seal housing, when a rubber-made gasket in "L"-shape cross section which is installed between these members is strongly urged by the other member of the paired seal rings which oppose each other or urged by the high pressure of the sealed fluid, a conventional construction allows the gasket to undergo elastic deformation with the one member of the seal rings in the axial direction. Prior art related to the current technique, for instance, can be found in Patent Reference 1 given below. Thus the respective seal surfaces of the pair of seal rings undergo a slight relative displacement in the urging direction of the external force acted onto the pair of seal rings. As a consequence, this slight displacement of the seal surfaces causes the sealed fluid to leak through between the seal surfaces.

Furthermore, since the gasket in "L" shape cross section fully occupies between the seal housing and the seal ring installed relative to the seal housing, frictional heat of the seal ring which is generated in sliding movement can hardly be transferred to the seal housing. This causes an accumulation of the generated heat in the sliding movement within the seal ring, thereby possibly causing a thermal stress to the seal ring. This thermal stress may induce cracking on the seal surface of the seal ring or cause deformation of the seal surface. Moreover, the frictional heat generated in the seal ring causes a fatigue in the gasket sealing between the seal ring and the seal housing, thereby being unable to provide a support to the seal ring as well as causing degradation of seal performance such as a leak of the sealed fluid from the contact interface of the gasket.

FIG. 11 illustrates a mechanical seal device 100 employed as a shaft seal device in an industrial pump. This mechanical seal device 100 has a similar construction to FIG. 3 in Patent Reference 1 given below though a gasket 110 has a different construction. The right-hand side portion of FIG. 11 which is omitted has a similar arrangement to FIG. 3 shown in Patent Reference 1. The mechanical seal device 100 depicted in FIG. 11 shows a half cut-away, partial cross-section view along the axial direction while the seal device is mounted in the shaft. This mechanical seal device 100 is arranged to combine a stationary seal portion 100A with a rotary seal portion 100B. The stationary seal portion 100A in cooperation with the rotary seal portion 100B prevents a leak of the inboard sealed fluid to the outboard side "A" in which the stationary seal portion 100A is mounted between a through bore of the seal housing 160 and a rotary shaft 160 which is inserted into the through bore.

A stationary seal ring 102 in the stationary seal portion 100A is securely attached by means of a gasket 110 which is installed between the stationary seal ring 102 and the seal housing 160. This gasket 110 provides a seal between the fit surfaces of both members after being installed between the seal housing 160 and the stationary seal ring 102. The gasket 110 then has a first rubber layer 110C adhering to the inner circumference of a reinforcement annulus 111. Also a second rubber layer 110D is adhered to the outer circumference of the reinforcement annulus 111. One end portion of the reinforcement annulus 111 at the inboard side is covered with a thin layer of rubber, which defines a thrust end portion 110A. Both of the other end portions of the first rubber layer 110C and the second rubber layer 110D define rubber end portions 110B which form almost the same surface level as a metal end portion 111A.

Axial length of the gasket 110 is arranged to be more or less the same as the axial length of the stationary seal ring 102. The inner circumferential surface of the gasket 110 forms a secure engagement with the outer circumferential surface of the stationary seal ring 102 while the outer circumferential surface 110D1 of the gasket 110 forms a secure engagement surface 160C of the seal housing 160. When this gasket 110 is inserted, the rubber end portion 110B and the back surface 102B of the stationary seal ring 102 are aligned to form the same surface level so as to abut a support surface 160A of the seal housing 160. And a stationary seal surface 102A is disposed at another end surface of the stationary seal ring 102 opposite the back surface 102B.

On the other hand, the rotary seal portion 100B opposing the stationary seal portion 100A is arranged in a similar manner to the one shown in the figures of Patent Reference 1. That is, it is comprised of a rotary seal ring 120, a bellows, not shown, for sealing between the rotary seal ring 120 and the rotary shaft 150, and a coiled spring, not shown, for exerting a resilient urging force to the rotary seal ring 120.

As described earlier, this mechanical seal device 100 securely seals the sealed fluid by means of a seal-tight contact between the stationary seal surface 102A of the stationary seal ring 102 and the rotary seal surface 120A of the rotary seal ring 120 for preventing the fluid from leaking to the outboard side "A". Furthermore a clearance gap between the seal housing 160 and the stationary seal ring 102 is tightly sealed by means of the gasket 110 in order to prevent the sealed fluid from leaking to the outboard side "A" through the clearance gap. When the stationary seal surface 102A and the rotary seal surface 120A undergo relative sliding movement under a seal-tight contact state between the two seal surfaces 102A, 120A, the both surfaces 102A, 120A start to generate heat as the sliding movement continues. In particular, in case of a sealed fluid containing impurities or being a chemical liquid, the seal surfaces are also heated due to the presence of the sealed fluid containing impurities therebetween.

In the mechanical seal device 100 thus constructed, the stationary seal ring 102 is mounted onto a fit engagement surface 160C of the seal housing 160 as illustrated in FIG. 12 and FIG. 13. FIG. 12 and FIG. 13 both show an insertion process in which the stationary seal ring 102 and the gasket 110 are installed in an integrated manner onto the fit engagement surface 160C of the seal housing 160. Members shown in FIG. 12 and FIG. 13 with identical reference numerals to those in FIG. 11 are omitted in their explanations due to their identical arrangement. When the integrated unit of the stationary seal ring 102 and the gasket 110 is fittingly mounted onto the fit engagement surface 160C of the seal housing 160, the thrust end portion 110A of the gasket 110 is urged by means of a force "P" against the fit engagement surface 160C so as to insert the stationary seal ring 102 together with the gasket 110. Under this circumstance, the second rubber layer 110D disposed in the outer circumferential side of the gasket 110 is subjected to shear strain due to a frictional force against the fit engagement surface 160C during the insertion process. Therefore the second rubber layer 110D undergoes elastic deformation such that cross section thereof is deformed to a parallelogram along the direction of insertion. Metal end portion 111A of the reinforcement annulus 111, however, comes to abut the support surface 160A which hampers further advance of the gasket 110. When the external force "P" is removed under this circumstance, the second rubber layer 110D tries to restore its rectangular form due to a spring back force "F" as shown in FIG. 11 or FIG. 13, thereby creating a clearance gap between the support surface 160A and the back surface 102B/ rubber end portions 110B. This clearance gap cannot be visually recognized by assembly workers and remains unknown about its presence from the outboard side "A".

In the assembled state of the stationary seal ring 102 as shown in FIG. 11 or FIG. 13, if there exists even a small clearance gap between the back surface 102B and the support surface 160A while the stationary seal surface 102A of the stationary seal ring 102 and the rotary seal surface 120A of the rotary seal ring 120 are kept in a seal-tight contact to each other, the stationary seal surface 102A of the stationary seal ring 102 which is urged by spring or fluid pressure via rotary seal ring 120 suffers from a random fluctuation according to the intensity of the pressure. Therefore this may cause a occasional failure of the seal-tight contact between the stationary seal surface 102A of the stationary seal ring 102 and the rotary seal surface 120A of the rotary seal ring 120, thereby leading to degradation of seal performance.

Also when a clearance gap is created between the back surface 102B and the support surface 160A, frictional heat generated on the stationary seal surface 102A of the stationary seal ring 102 is less transferred to the support surface 160A side of the seal housing 160, thereby accelerating accumulation of the heat in the stationary seal ring 102. As the result, the stationary seal surface 102A of the stationary seal ring 102 undergoes deformation due to thermal stress and finds it difficult to maintain a seal-tight contact with the rotary seal surface 120A. And besides, since the accumulated heat is transferred from the stationary seal ring 102 to the gasket 110, the beat causes a fatigue of the rubber-made gasket 110, and is apt to degrade a seal performance for sealing between the seal housing 160 and the stationary seal ring 102.

Patent Reference 1: Japanese Laid-open Utility Model No. H5-1075 (see FIG. 3)

DISCLOSURE OF THE INVENTION

Technical Problems to be Solved by the Invention

The present invention is proposed for alleviating the above mentioned disadvantages. and the technical objective of this invention is to prevent an irregular displacement of the seal surface of the seal ring in the mechanical seal device which causes degradation of the seal performance. Another objective is to prevent degradation of the seal performance which is caused by a fatigue of the packing for installing a seal ring in seal-tight manner due to slide friction heat transferred from the seal ring. Yet another objective is to prevent occurrence of troubles such as deformation, cracks and the like on the seal surface of the stationery seal ring in association with the slide friction heat.

Means for Solving the Technical Problems

The present invention is made to achieve the above mentioned technical objectives, and a technical solution of this invention is embodied as follows.

A mechanical seal device of the present invention is a mechanical seal device being installed in a step shouldered bore which is formed by a fit engagement circumferential surface which is disposed in a bore hole of seal housing receiving a shaft therethrough, and a support surface which retains a radially inward step in relation to the fit engagement circumferential surface. The mechanical seal device is comprised of a packing and a stationary seal ring in which the packing is in an annular form and is made of rubber-like resilient material and has a contact surface, an adhesion surface and an insertion nose end portion, wherein the contact surface securely engages the fit engagement circumferential surface, wherein the adhesion surface is disposed in inner circumferential side in relation to the contact surface, wherein the insertion nose end portion is located at the frontal tip in a direction of insertion against the fit engagement circumferential surface; in which the stationary seal ring has a secure engagement surface, back surface and a seal surface, wherein the secure engagement surface is coupled with the adhesion surface of the packing, wherein the back surface forming a seal-tight contact with the support surface, wherein the seal surface is disposed opposite the back surface, wherein a cavity portion is created between the insertion nose end portion and an opposing surface in the support surface side when the back surface abuts the support surface, wherein the back surface is in a seal-tight relation to the support surface by means of elastic force caused by the packing which is obtained when the packing is plunged into the cavity portion.

EFFECTS OF THE INVENTION

According to the mechanical seal device of the present invention, the packing in an annular form, which is installed between the secure engagement surface of the seal ring and the fit engagement surface of the seal housing, is retained in a secure engagement state by plunging the insertion nose end portion into the cavity portion. This enables the packing to undergo elastic deformation so as to keep the back surface of the stationary seal ring in contact with the support surface as shown in FIG. 9 and FIG. 10. As the result, as the back surface of the stationary seal ring is in contact with the support surface of the seal housing, the position of the sliding seal surface in an axial direction is prevented from displacement despite an urging force given by a spring means located in the rotary seal ring side or a high pressure of the sealed fluid. And the sliding seal surface is expected to exhibit an outstanding seal performance. Also when the back surface of the stationary seal ring and the support surface of the seal housing are always kept in a contact relation to each other, the heat generated in sliding of the sliding seal surface is transferred from the stationary seal ring to the seal housing by way of the support surface, and heating up of the stationary seal ring due to the slide friction heat is prevented accordingly. As the result, occurrence of deformation, fracture or the like due to thermal stress in the slide seal surface which is caused by the heat accumulated in the stationary seal ring is prevented. Also the heat accumulated in the stationary seal ring during the sliding movement is prevented from being transferred to the packing and causing a trouble to the rubber-like elastic material of the packing. Therefore leaking of the sealed fluid from the packing also can be prevented in an effective manner.

Figure 1:
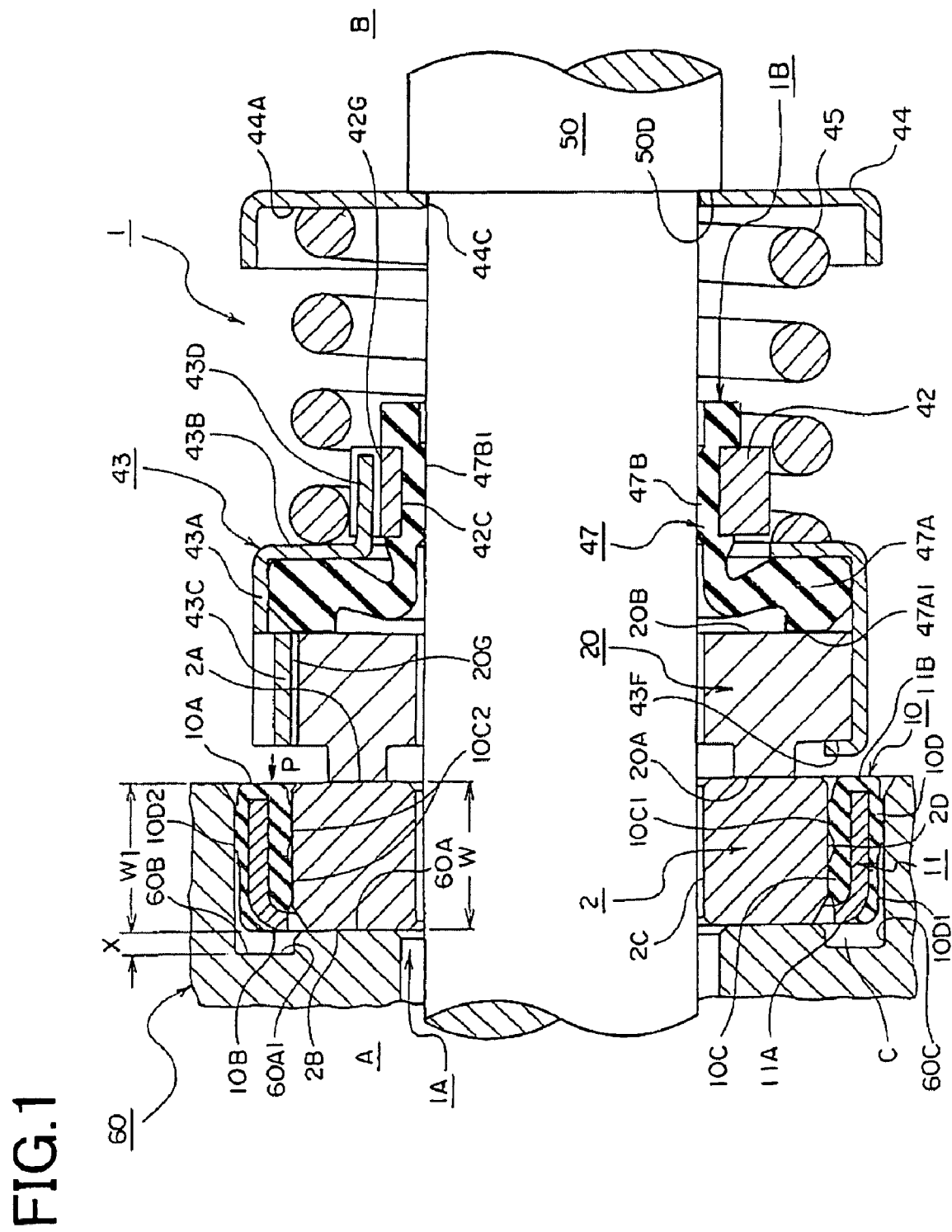
FIG. 1 is a full cross sectional view of a mechanical seal device installed in the shaft as a first embodiment related to the present invention.

DESCRIPTION OF REFERENCE NUMERALS 1 mechanical seal device
1A first portion
1B second seal portion
2 stationary seal ring
2A seal surface
2B back surface
2C inner circumferential surface
2D secure engagement surface
10 packing
10A pushing surface
10B insertion nose end portion
10C first elastic layer
10C1 inner contact surface
10C2 projectional portion
10D second elastic layer
10D1 outer contact surface
10D2 seal area
10D3 protrusion portion
10D4 stopper portion
11 reinforcement annulus
11A insertion nose end surface
11B plunging end portion
15 support ring
16B outer circumferential surface
15C outer diameter surface
16D side wall surface
15E cylindrical portion
20 rotary seal ring
20A opposing seal surface
20B urged surface
20G guide groove
43F clinch portion
60 seal housing
60A support surface
60A1 recessed support surface (opposing surface in support surface side)
60B recessed bore
60C fit engagement circumferential surface
60E locking step portion
P plunging apparatus
W first width
W1 second width
X depth
A outboard region
B inboard region

BEST MODE FOR CARRYING OUT THE INVENTION

Described below is the details of the figures of preferred embodiments of a mechanical seal device in accordance with the principles of the present invention. All the figures explained below are constructed according to actual design drawings with accurate dimensional relations.

Embodiment 1

Figure 2:
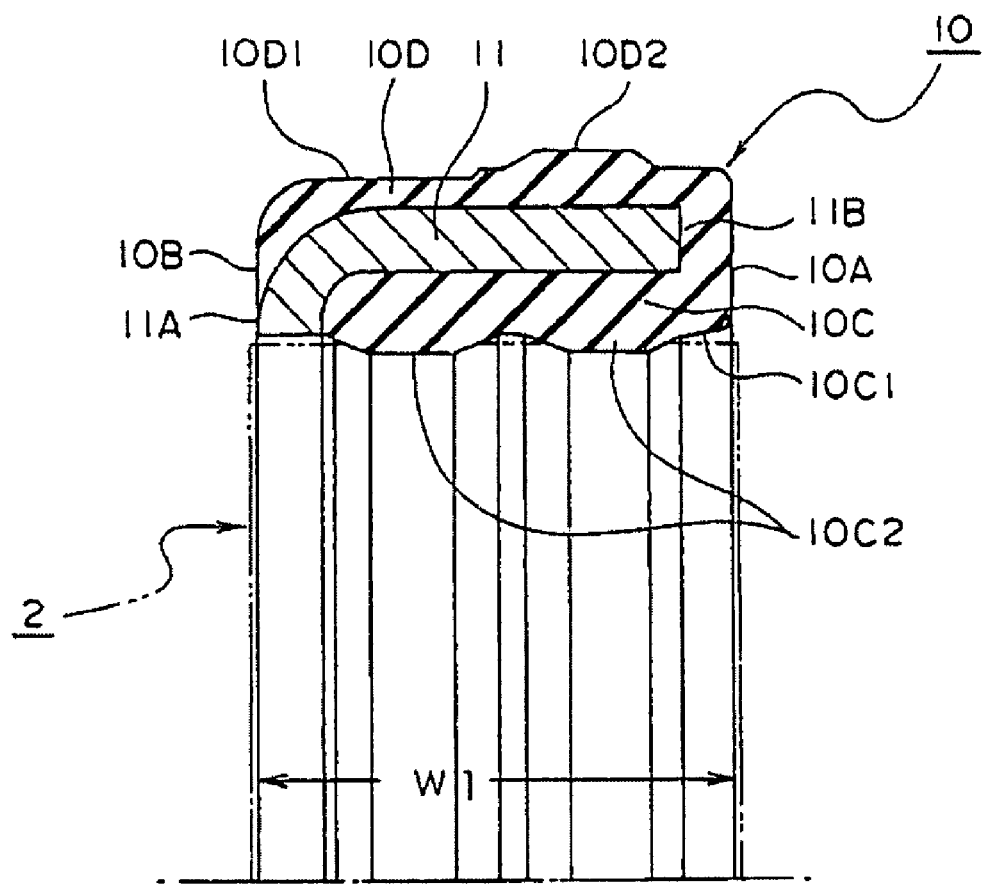
FIG. 2 is an enlarged half cut-away cross sectional view of the packing shown in FIG. 1.

FIG. 1 depicts a full cross sectional view of a mechanical seal device as a first embodiment related to the present invention. FIG. 2 is an enlarged half cut-away cross sectional view of the packing in a cylindrical form shown in FIG. 1. This FIG. 1 illustrates the mechanical seal device 1 which is installed between a rotary shaft 50 and a recessed bore 60B which communicates a bore hole which extends through the seal housing 60 in axial direction thereof.

In FIG. 1, the mechanical seal device 1 is comprised of a first seal portion 1A and a second seal portion 1B in pair in which the former is fixed in the seal housing 60 and the latter is mounted in the rotary shaft 60. The rotary shaft 60 and the seal housing 60 are in a relation of relative rotation, and there are some cases in which the relative rotation between the two members is realized in such a way that the rotary shaft 60 is fixed while the counterpart, seal housing 60, undergoes a rotational motion. Further explanations will be given below by referring to FIG. 1 and FIG. 2.

A carbon-made rotary seal ring 20 is disposed in the second seal portion 1B which comprises the mechanical seal device 1. The rotary seal ring 20 has an annular body in its entirety and the outer circumferential surface of the rotary seal ring 20 disposes a plurality of guide grooves 20G along the circumference. These guide grooves 20G extend in axial direction on the outer circumference. The inner circumference defines a through hole which extends along the rotary shaft 60 while leaving a small clearance gap relative to the rotary shaft 50. Furthermore, there is disposed an opposing seal surface 20A on the leftmost end portion of the rotary seal ring 20 in the figure. The opposite side of the opposing seal surface 20A defines an urged surface 20B. The rotary seal ring 20 can be made of carbon material with high lubrication ability, silicon carbide with excellent hardness, composite slide material with both lubrication and hardness in which a lubrication ability is added to silicon carbide, engineering ceramics and the like.

A drive case 43 retains a cylindrical portion 43A which fits the outer circumferential surface of the rotary seal ring 20 and a bottom portion 43B with a hole which is located at one end of the cylindrical portion 43A. The inner circumference of the cylindrical portion 48A in the drive case 43 forms locking portions 43C which protrude in radially inward direction so as to engage with the guide groove 20G by means of plunging into the guide groove 20G. Also disposed at the radially inner edge of the bottom portion 43B are locking segments 43D which are in an axially protruding strip form and arranged in two or three equally spaced manner along the circumference. And besides, a plurality of clinch portions 43F are disposed at the other end of the cylindrical portion 43A along the circumference. This drive case 43 is made of steel, aluminum, stainless steel and the like, and is fabricated by means of press machining.

A bellows 47 is disposed to the urged surface 20B side of the rotary seal ring 20 which is made of rubber or resin material. This bellows 47 retains a cylindrical flexible portion which is formed by inflecting the one end of the outer cylindrical portion 47A radially inward, and also retains an inner cylindrical fitting portion 47B which is continually formed from the flexible portion. One end surface of the outer cylindrical portion 47A defines a contact surface 47A1. Contact state of the contact surface 47A1 and the urged surface 20B can be assured by means of clamping the rotary seal ring 20 and the outer cylindrical portion 47A between the clinch portion 43F and the bottom portion 43B of the drive case 43 while maintaining the contact surface 47A1 in contact with the urged surface 20B of the rotary seal ring 20. This means that the rotary seal ring 20 and the bellows 47 are kept in contact with each other by means of the drive case 43. Also the inner circumferential surface 47B1 of the inner cylindrical fitting portion 47B fits the outer diameter surface of the rotary shaft 60. Furthermore, a drive ring 42 is securely attached by the joint surface 42C to the outer diameter surface of the inner cylindrical fitting portion 47B. This drive ring 42 secures the inner cylindrical fitting portion 47B relative to the rotary shaft 50. The tight contact of the inner circumferential surface 47B1 of the inner cylindrical fitting portion 47B provides a seal to a fit engagement between the inner cylindrical fitting portion 47B and the rotary shaft 50 while the urged surface 20B side of the rotary seal ring 20 is sealed by means of the contact surface 47A1 of the bellows 47 being brought to a seal-tight contact with the urged surface 20B of the rotary seal ring 20.

This drive ring 42 disposes a plurality of axially extending locking slots 42G which are arranged along outer circumference thereof in equally spaced manner. The locking grooves 42G come to lock with the locking segments 43D of the drive case 43 so as to permit the drive case 43 to rotate together with the drive ring 42. A spring receiving ring 44 is also disposed in the inboard region "B" side of the bellows 47 which is securely fitted to a step shoulder portion 50D of the rotary shaft 60. This spring receiving ring 44 has an annular-shape body with "L" shaped cross section. The side wall of the spring receiving ring 44 defines a spring receiving surface 44A. And a resilient urging means 45 such as a coiled spring or the like is disposed between the spring receiving surface 44A and the bottom portion 43B of the drive case 43 in order to resiliently urge the rotary seal ring 20. Though this resilient urging means 45 appears as a coiled spring, it may be substituted by a cone-shaped helical coil spring. The spring receiving ring 44 is fabricated by machining stainless steel sheet, ordinary steel sheet or the like.

And the rotary seal ring 20, drive case 43, drive ring 42 and bellows 47 which are mutually connected rotate together with the rotary shaft, At the same time, since the locking grooves 42G of the drive ring 42 and the locking segments 43D of the drive case 43 are in a relatively moveable relation to each other, the resilient urging means 46 exerts a resilient, urging force to the drive case 43 and the rotary seal ring 20 after forcing the flexible portion of the bellows 47 elastic deformation. The opposing seal face 20A of the rotary seal ring 20 which is urged by the resilient urging means 45 comes to a seal-tight contact in a sliding relation to the seal face 2A of the stationary seal ring 2. The resilient urging means 45 can be replaced by a combination of a plurality of springs instead of the foresaid spring.

The recessed bore 60B of the seal housing 60 is formed at the distal end portion of the bore into which the rotary shaft 50 is inserted. The recessed bore 60B is comprised of a support surface 60A which radially spans in relation to the rotary shaft 60 and a fit engagement circumferential surface 60C which is in a vertical relation to the support surface 60A. A portion of this support surface 60A near the fit engagement circumferential surface 60C is recessed in relation to the support surface GOA so as to define a recessed support surface 60A1 (hereafter also referred to as an opposing surface in the support surface side) which forms a cavity portion "C" within the recessed support surface 60A1.

This recessed bore 60B receives the first seal portion 1A thereto. The first seal portion 1A is arranged in an opposing relation to the second seal portion 1B. The first seal portion 1A then is comprised of the stationary seal ring 2 and the packing (gasket) 10. Inner circumference of the stationary seal ring 2 defines an inner circumferential surface 2C which forms a loose fit with a clearance gap in relation to the rotary shaft 50. Outer circumference of the stationary seal ring 2 defines a secure engagement surface 2D. And besides the stationary seal ring 2 disposes a seal surface 2A which forms a seal-tight contact with the opposing seal surface 20A of the rotary seal ring 20 in an opposing relation. The opposite surface of the stationary seal ring 2 in relation to the seal surface 2A defines a back surface 2B. The seal surface 2A and the opposing seal surface 20A are brought to a seal-tight contact to each other by means of an urging force acted on the urged surface 20B of the rotary seal ring 20 via bellows 47 which is provided by a resilient urging force of the resilient urging means 46 or sealed fluid pressure. As the result, the mechanical seal device 1 provides a tight seal in order to keep the outboard region "A" from the inboard region "B". The stationary seal ring 2 which is made of silicon carbide can be fabricated with super-hard alloy, carbon, ceramics or the like.

Figure 10:
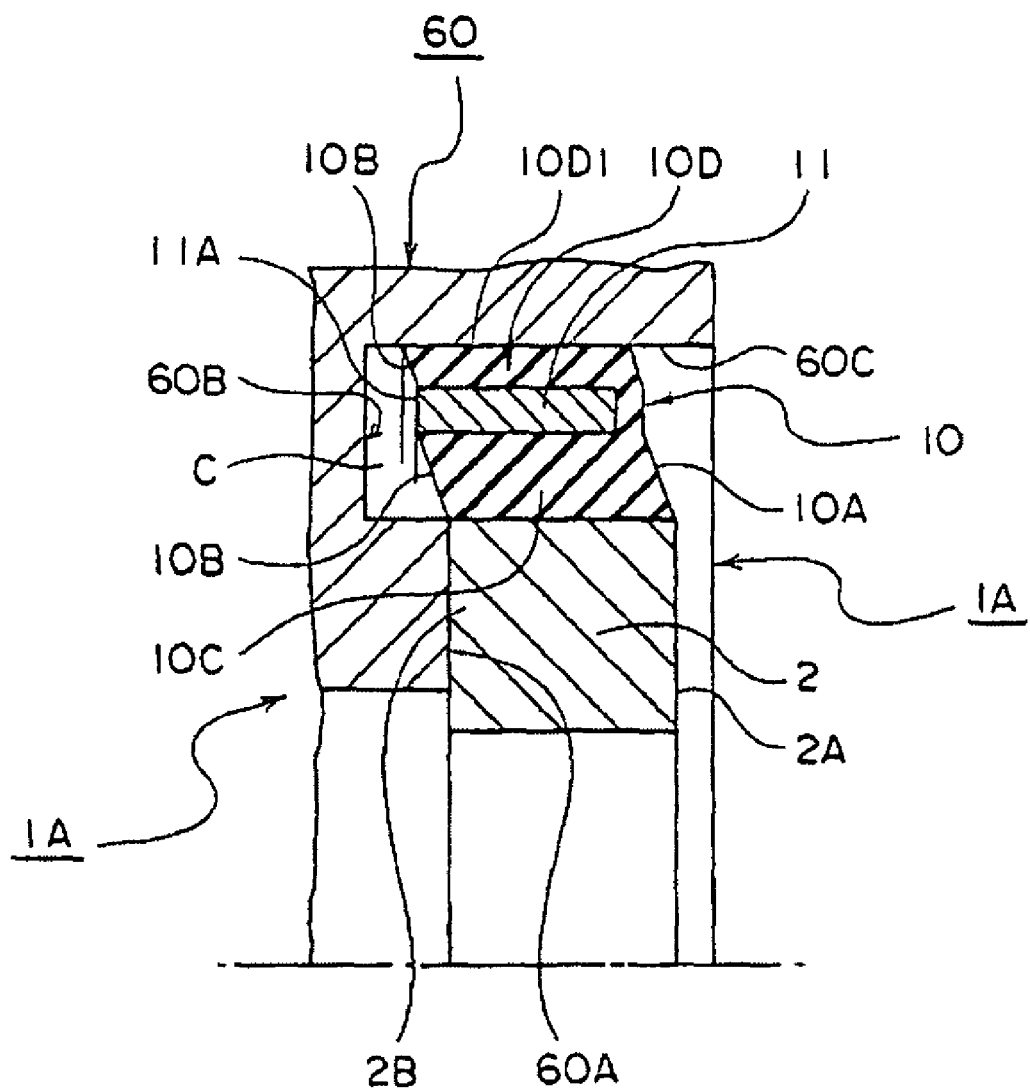
FIG. 10 illustrates the completion of engagement wherein the packing of the present invention and the stationary seal ring are mounted onto the fit circumferential surface of the housing.
Figure 11:
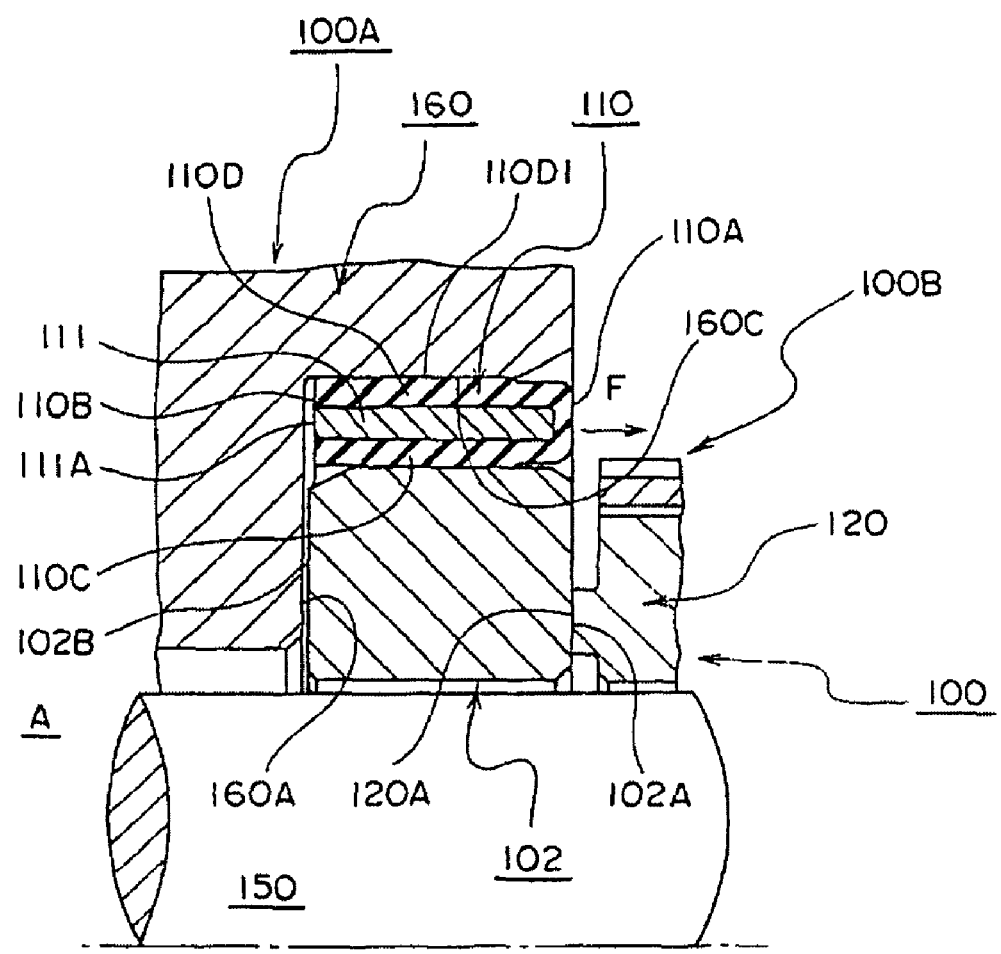
FIG. 11 shows a half cut-away cross sectional view of the other mechanical seal device relative to the present invention.
Figure 12:
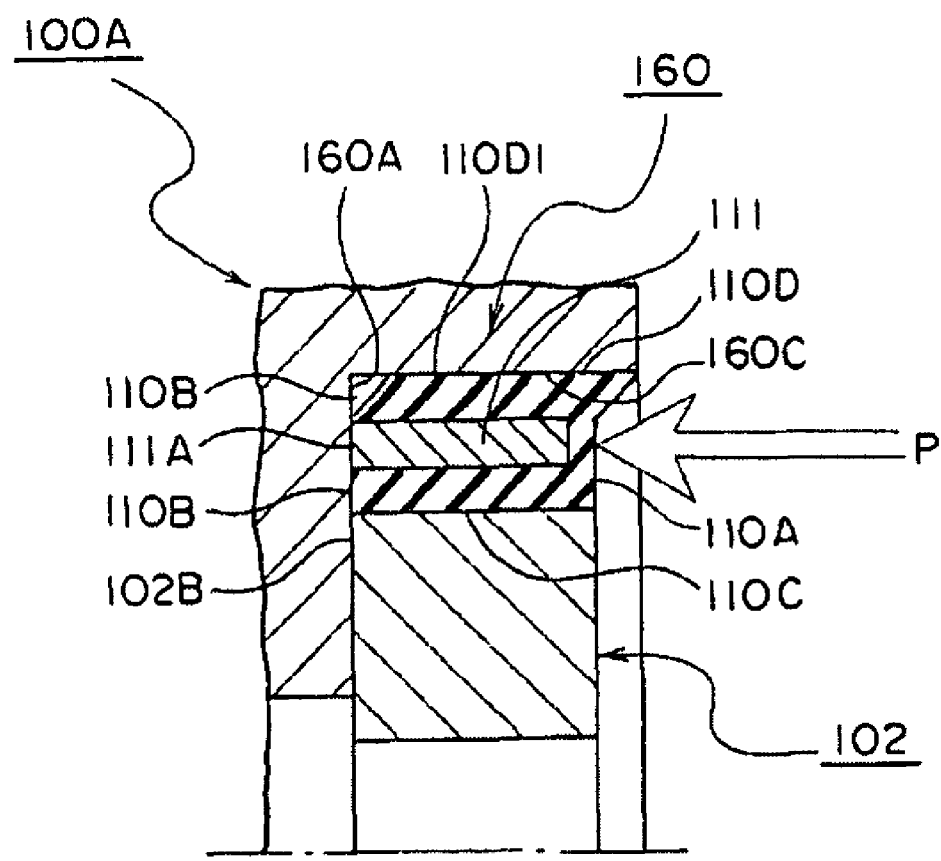
FIG. 12 illustrates the first stage of the insertion process in which the packing of FIG. 11 and the stationary seal ring are mounted onto the fit circumferential surface of the housing.
Figure 13:
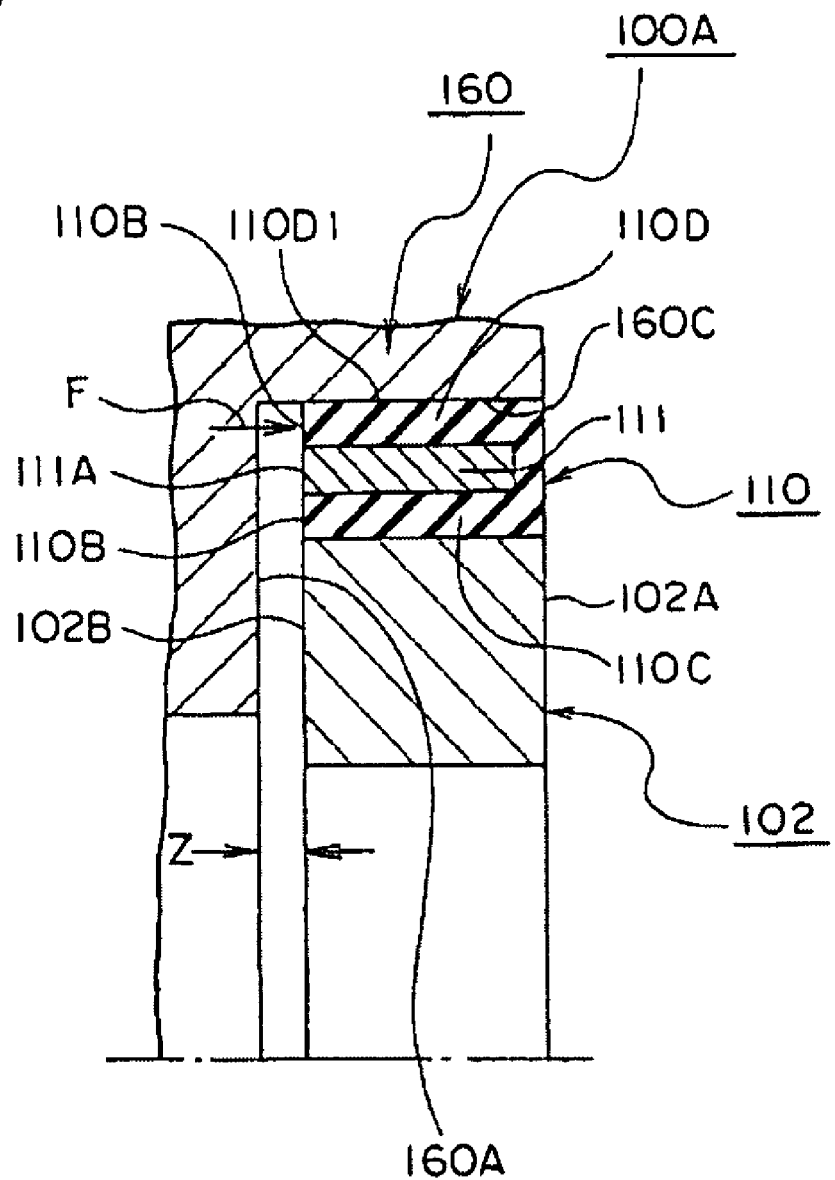
FIG. 13 illustrates the completion of engagement wherein the packing of FIG. 11 and the stationary seal ring are Counted onto the fit circumferential surface of the housing.

The packing 10 which is disposed between the foresaid secure engagement surface 2D of the stationary seal ring 2 and the fit engagement circumferential surface of the seal housing 60 is arranged in a cylindrical form which is made of rubber material or resin material. The packing 10 shown in FIG. 10 is arranged to cover the entirety of the cylindrical reinforcement annulus 11 with a rubber-like elastic material such as rubber or resin material in a surrounding relation. The inner circumferential side of the reinforcement annulus 11 defines a first elastic layer 10C. The inner circumferential surface of the first elastic layer 10C then defines an inner contact surface 10C1. The inner contact surface 10C1 further disposes a projectional portion (seal portion) 10C2 thereon (refer to the packing 10 enlarged in FIG. 2). The packing 10 then achieves a secure contact with the secure engagement surface 2D of the stationary seal ring 2 via the projectional portion 10C2. Role of the projectional portion 10C2 may include not only sealing performance but also locking means which enables it to engage with grooves on the secure engagement surface 2D in a locking relation (see FIG. 2). No matter which engagement means may be used, the secure engagement surface 2D of the stationary seal ring 2 and the inner contact surface 10C1 of the packing 10 are assured for a secure joint therebetween by means of either press fit engagement, adhesion material, or locking means.

A second elastic layer 10D is formed in the outer circumferential side of the packing 10. Outer contact surface 10D1 of the second elastic layer 10D retains a seal area 10D2 which projects in multiple steps. This seal area 10D2 not only creates a strong couple with the fit engagement circumferential surface 60C of the seal housing 60 but also provides a seal to the sealed fluid. This tolerates a rough surface finish of the fit engagement circumferential surface 60C forming a secure contact with the outer contact surface 10D1, thereby reducing fabrication cost of the fit engagement circumferential surface 60C. Inboard region "B" side of the packing defines a pushing surface 10A. This pushing surface 10A is used for fittingly inserting the stationary seal ring 2 and packing 10 to the recessed bore 60B. Opposite the pushing surface 10A in the packing 10 is formed an insertion nose end portion 10B. Insertion nose end portion 10B side of the reinforcement annulus 11 also defines an insertion nose end surface 11A. The insertion nose end surface 11A should preferably be aligned on the same surface level as the insertion nose end portion 10B and also be exposed out of he second elastic layer 10D.

Second width "W1" of the packing 10 in the axial direction is arranged to be more or less the same as the first width "W" of the stationary seal ring 2 in the axial direction. Depth "X" of the cavity portion "C" is chosen in such a way that a press-contact state of the support surface 60A in relation to the back surface 2B can be maintained by elastic deformation force even when elastic restoration occurs after the packing 10 is inserted into the cavity portion "C" (see the insertion process of the packing 10 in FIG. 9 and FIG. 10). The process for assembling the packing 10 while pushing it is given in FIG. 7 through FIG. 10. The installation process of the packing 1 shown in FIG. 7 through FIG. 10 represents its assembly sequence for the first seal portion 1A in FIG. 1. As shown in details by the reference numerals in FIG. 7 through FIG. 10, unmentioned numerals being identical to those given in FIG. 1 should be considered as identical numbers to those explained in FIG. 1. Therefore explanations for members in FIG. 7 through FIG. 10 are omitted.

Figure 7:
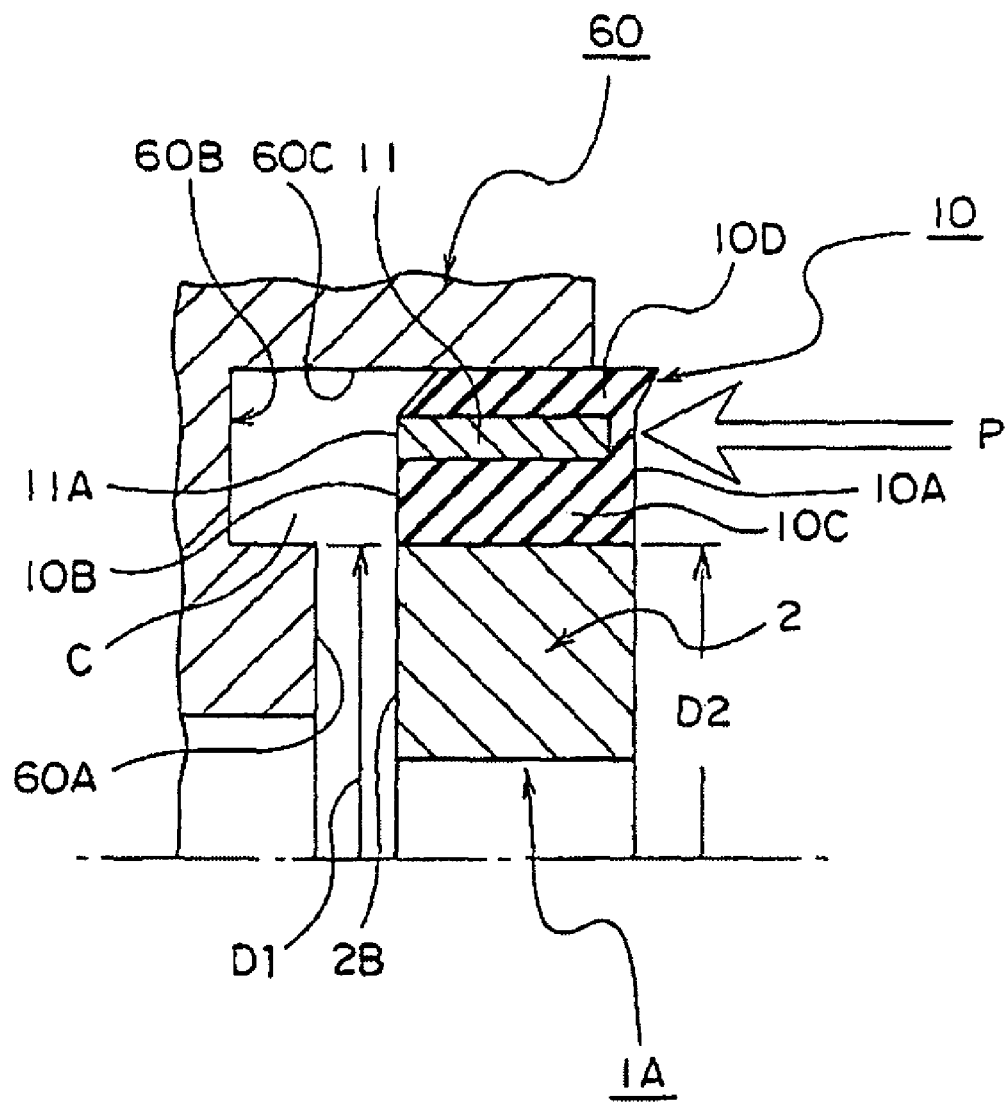
FIG. 7 illustrates the first stage of the insertion process in which the packing of the present invention and the stationary seal ring are mounted onto the fit circumferential surface of the housing.
Figure 8:
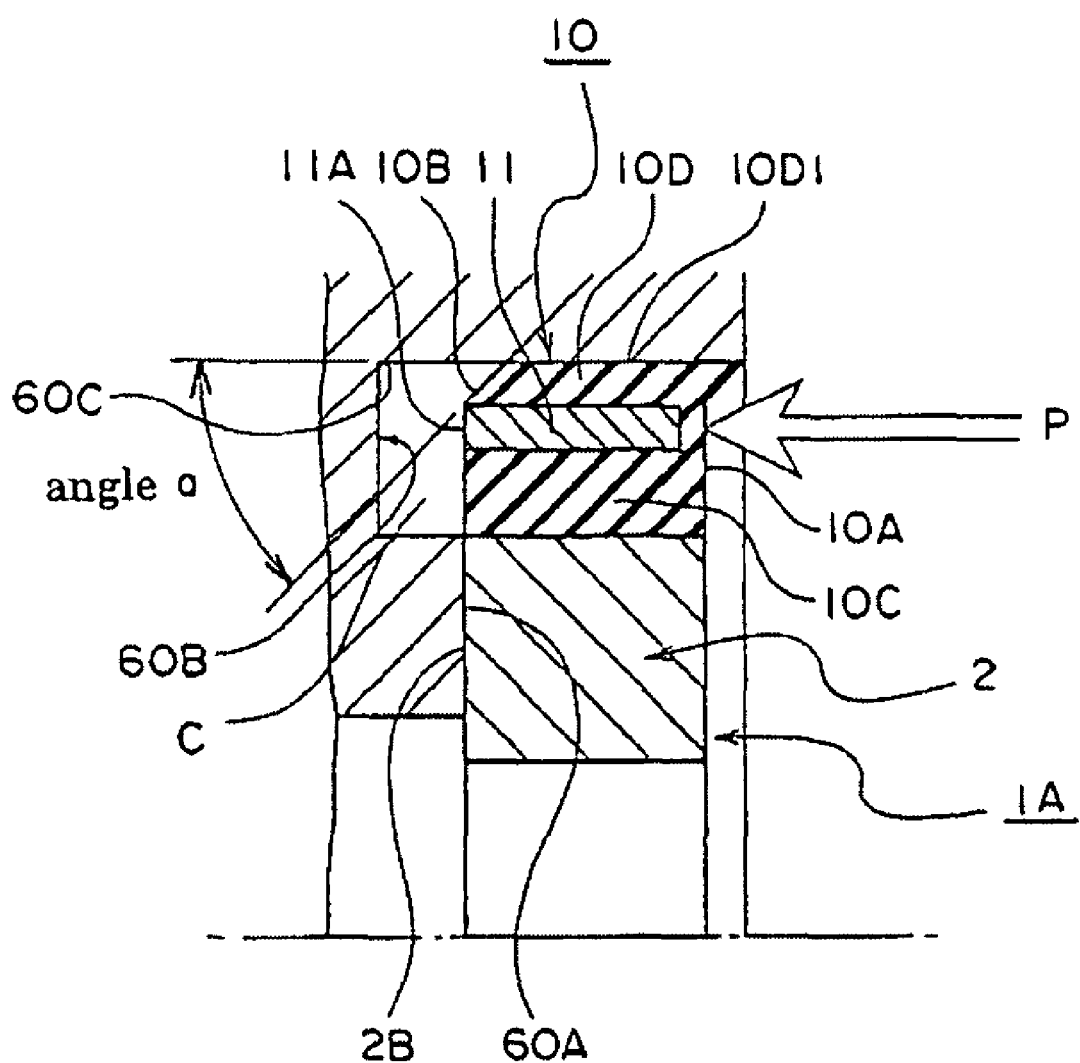
FIG. 8 illustrates the second stage of the insertion process in which the packing of the present invention and the stationary seal ring are mounted onto the fit circumferential surface of the housing.
Figure 9:
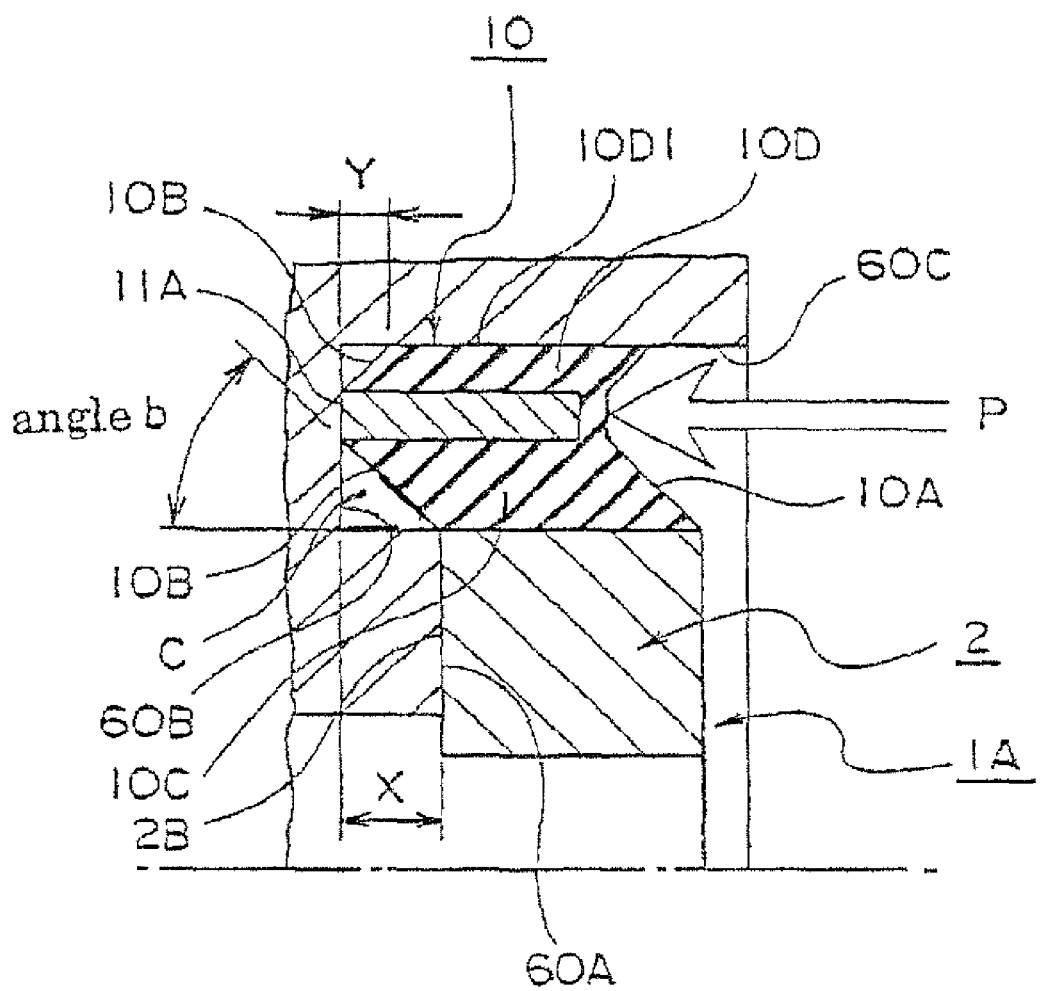
FIG. 9 illustrates the third stage of the insertion process in which the packing of the present invention and the stationary seal ring are mounted onto the fit circumferential surface of the housing.

First, as shown in FIG. 7, the stationary seal ring 2 is joined with the packing 10. The packing 10 then is plunged against the fit engagement circumferential surface 60C by being urged at the pushing surface 10A by a plunging apparatus "P", not shown. FIG. 8 shows an intermediate state of the assembly process of the packing 10 in which the back surface 2B comes to abut the support surface 60A after the packing is plunged against the fit engagement circumferential surface 60C. Under this circumstance, the outer contact surface 10D1 of the second elastic layer 10D undergoes elastic deformation due to the friction. in relation to the fit engagement circumferential surface 60C so that cross section thereof is deformed to a parallelogram form (shear strain). This second elastic layer 10D is elastically deformed to a parallelogram cross section by a strain angle "a" with a strain (inclined) surface at the insertion nose end portion 10B. And besides, as shown in FIG. 9, the insertion nose end portion 10B and the insertion nose end surface 11A of the packing 10 are plunged deep until they come to abut the opposing surface which is located in the support surface side of the cavity portion "C". In this case, the first elastic layer 10C is elastically deformed to a parallelogram cross section by a strain angle "b" with a strain (inclined) surface at the insertion nose end portion 10B. And the dimension "Y" of the strain surface of the second elastic layer 10D in the axial direction formed at the strain angle "a" (also see FIG. 8) should necessarily be smaller than the dimension "X" of the strain of the first elastic layer 10C in the axial direction formed at the strain angle "b". In case of absence of the reinforcement annulus 11 in the packing 10, since pushing the outer circumference area of the packing 10 makes the entire strain surface formed in the insertion nose end portion 10B of the packing 10 inclined at a strain angle "b" as shown in FIG. 9, the back surface 2B is retained under a strong contact in relation to the support surface 60A.

FIG. 10 shows the first seal portion 1A in place after the plunging apparatus "P", not shown, is removed. Strain surface at the insertion nose end portion 10B of the packing 10 in the first seal portion 1A is slanted from the insertion nose end surface 11A of the reinforcement annulus 11 as a boundary. And the shear strain of the packing 10 allows the back surface 2B of the stationary seal ring 2 to be kept in a seal-tight contact with the support surface 60A. Though the plunging apparatus "P" is omitted in the figure, the plunging apparatus "P" is equipped with a plunging jig whose inner and outer diameters are more or less the same as those of a ring body combining the stationary seal ring 2 and the packing 10. The end surface on the plunger side of the plunging jig has a protrusion which comes to abut the pushing surface 10A of the packing 10 in which the protrusion is projected by dimension "X" as shown in FIG. 9 higher than the pushing surface 10A which has a contact relation with the seal surface 2A of the stationary seal ring 2. The plunging apparatus "P" is arranged to insert the packing 10 into the recessed bore 60B by thrusting the plunging jig in such a way that a male screw engages a female screw which is disposed at the center of a tripod frame supported by the seal housing 60.

Embodiment 2

Figure 3:
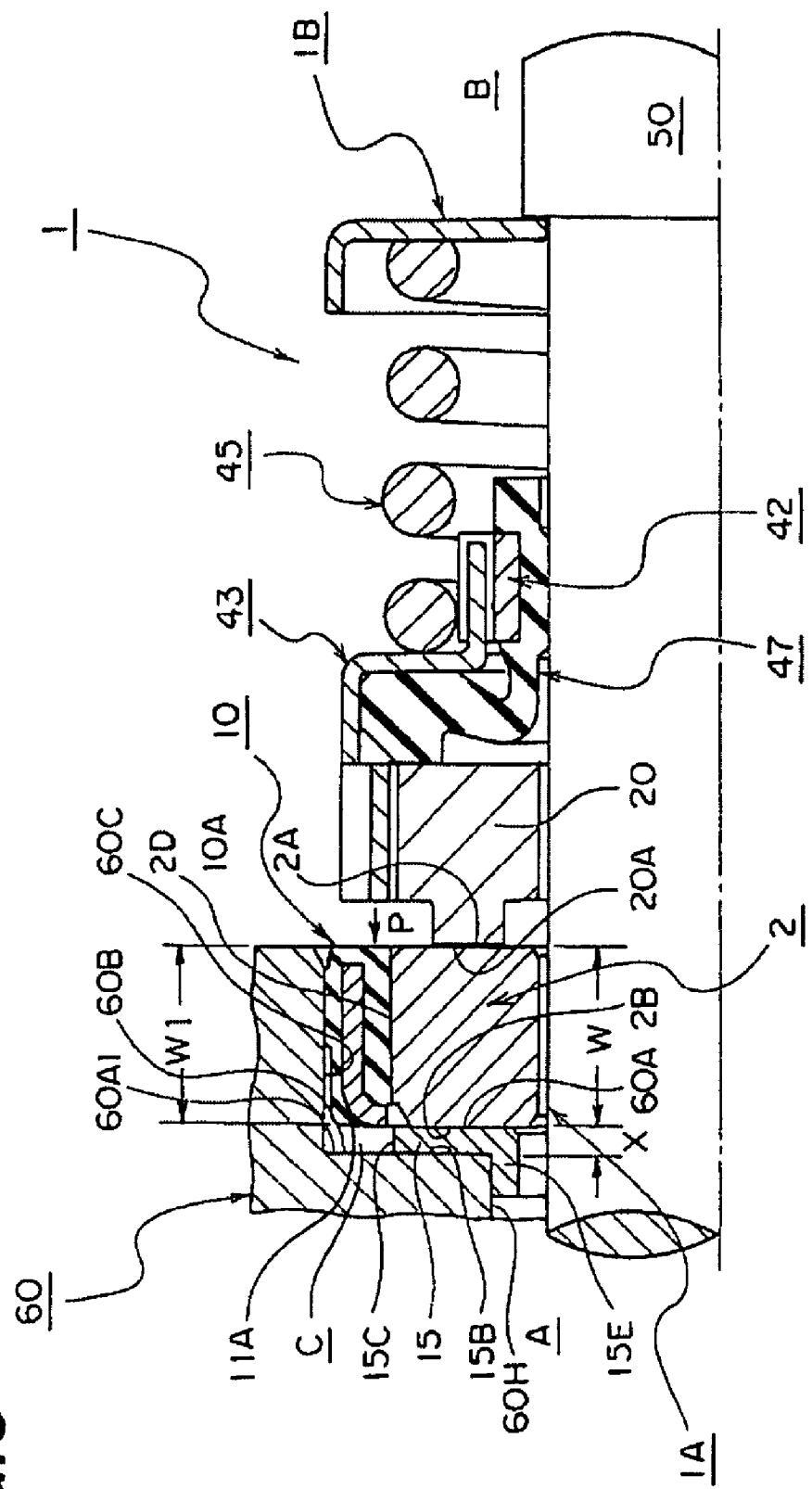
FIG. 3 is a half cut-away cross sectional view of a mechanical seal device installed in the shaft as a second embodiment related to the present invention.

FIG. 3 shows a half cut-away cross sectional view of a mechanical seal device 1 as a second embodiment related to the present invention. What makes FIG. 3 different from FIG. 1 is that the support surface 60A is defined at the front surface of a support ring 16 in the axial direction which is an attachment element. The seal housing 60 disposes a recessed bore 60B therein. The circumferential surface 60H of the through bore which is continuously formed in relation to this recessed bore 60B securely receives a cylindrical portion 15E of the support ring 16 which is in "L"-shape cross section. And the side surface 15B in the flange portion of the support ring 16 is brought to a contact with a radially formed surface of the recessed bore 60B. Then thickness "X" of the flange portion defines a cavity portion "C" of depth "X", and the cavity portion "C" is easily formed by the outer diameter surface 15C of the support ring 15 and the recessed support surface 60A1. The stationary seal ring 2 and the packing 10 are joined by means of adhesive material. Other configurations are more or less the same as the mechanical seal device in FIG. 1 as indicated by the same reference numerals.

According to a mechanical seal device 1 thus arranged, depth "X" of the cavity portion "C" can arbitrarily be designed by means of the support ring 15. Setting the depth "X" deep increases the margin for plunging in relation to the recessed support surface 10A1 of the packing 10, thereby being able to strengthen the contact between the support surface 60A and the back surface 2B. As the result, even when a structural constraint does not allow a sufficient radial length of the radial surface of the recessed bore 60B, sliding frictional beat generated in the stationary seal ring 2 can be released to the seal housing 60 by way of support ring 15 because the stationary seal ring 2 is provided a support by the support ring 15. In particular, the cylindrical portion 15E of the support ring 15 is expected to exhibit an outstanding heat release effect. This support ring 15 should preferably be made of material with high thermal conductivity such as cupper, aluminum, stainless steel and the like.

Embodiment 3

Figure 4:
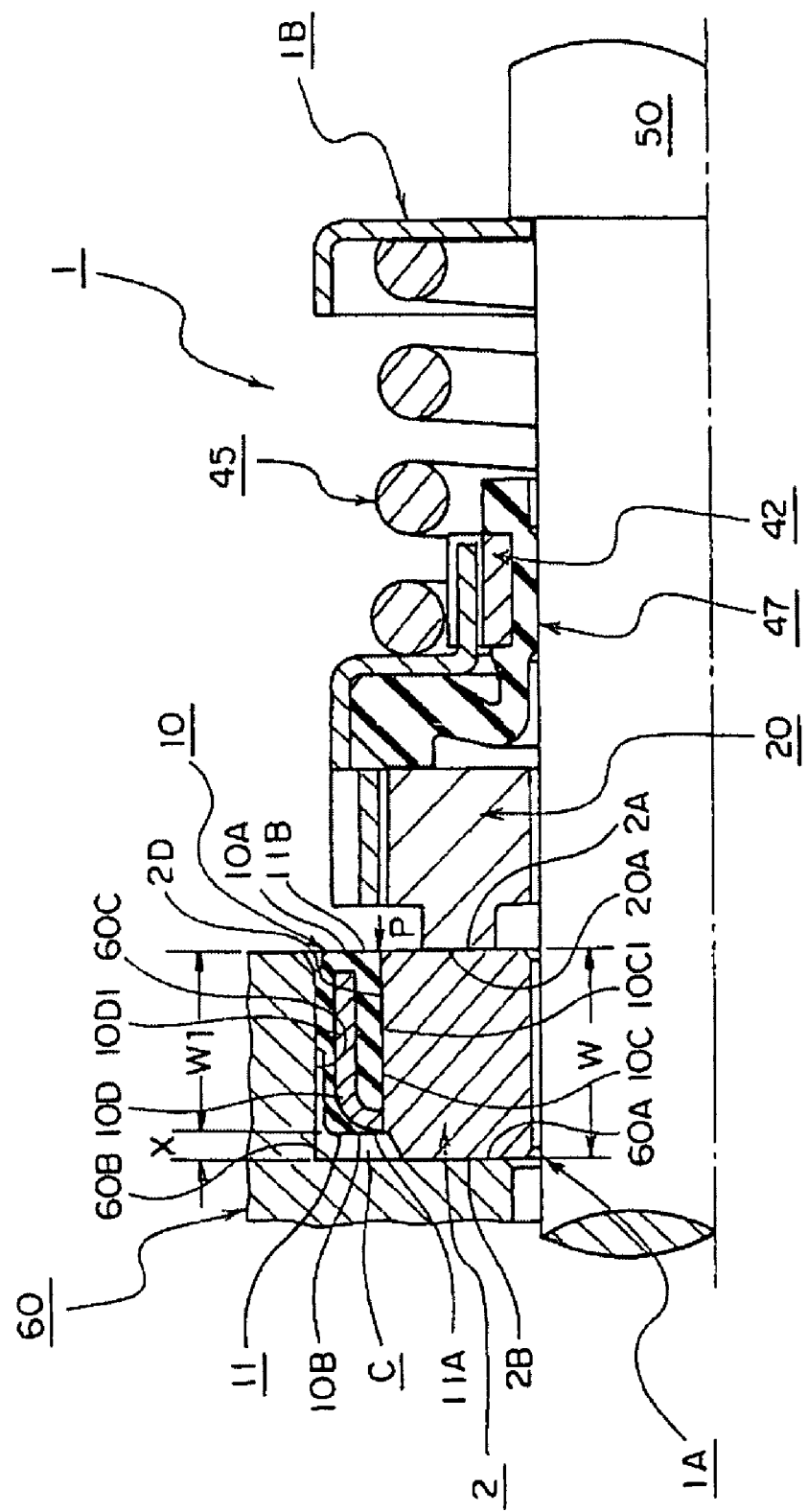
FIG. 4 is a half cut-away cross sectional view of a mechanical seal device installed in the shaft as a third embodiment related to the present invention.

FIG. 4 is a half cut-away cross sectional view of a mechanical seal device 1 as a third embodiment related to the present invention. What makes FIG. 4 different from the mechanical seal device 1 in FIG. 1 is that the first width "W" is arranged greater than the second width "W1" of the packing 10 by the depth "X". And making the first width "W" of the stationary seal ring 2 larger than the second width "W1" of the packing enables it to easily form a cavity portion "C" of depth "X" between the insertion nose end portion 10B and an opposing surface in the support surface 60A side (a portion of the support surface 60A being radially outward in relation to the back surface 2B). Other configurations in FIG. 4 are more or less the same as those in FIG. 1 as indicated by identical reference numerals. A mechanical seal device 1 thus configured is able to form a cavity portion "C" in an easy manner. When the secure engagement surface 2D of the stationary seal ring 2 securely engages inner contact surface 10C1 of the packing 10, an inner circumferential surface which is formed by inflecting the end portion of the reinforcement annulus 11 is able to establish a firm joint in the fit engagement in relation to the secure engagement surface 2D. Furthermore, the way to mold a packing 10 becomes straightforward and the cost for the. molding process can be reduced.

Embodiment 4

Figure 5:
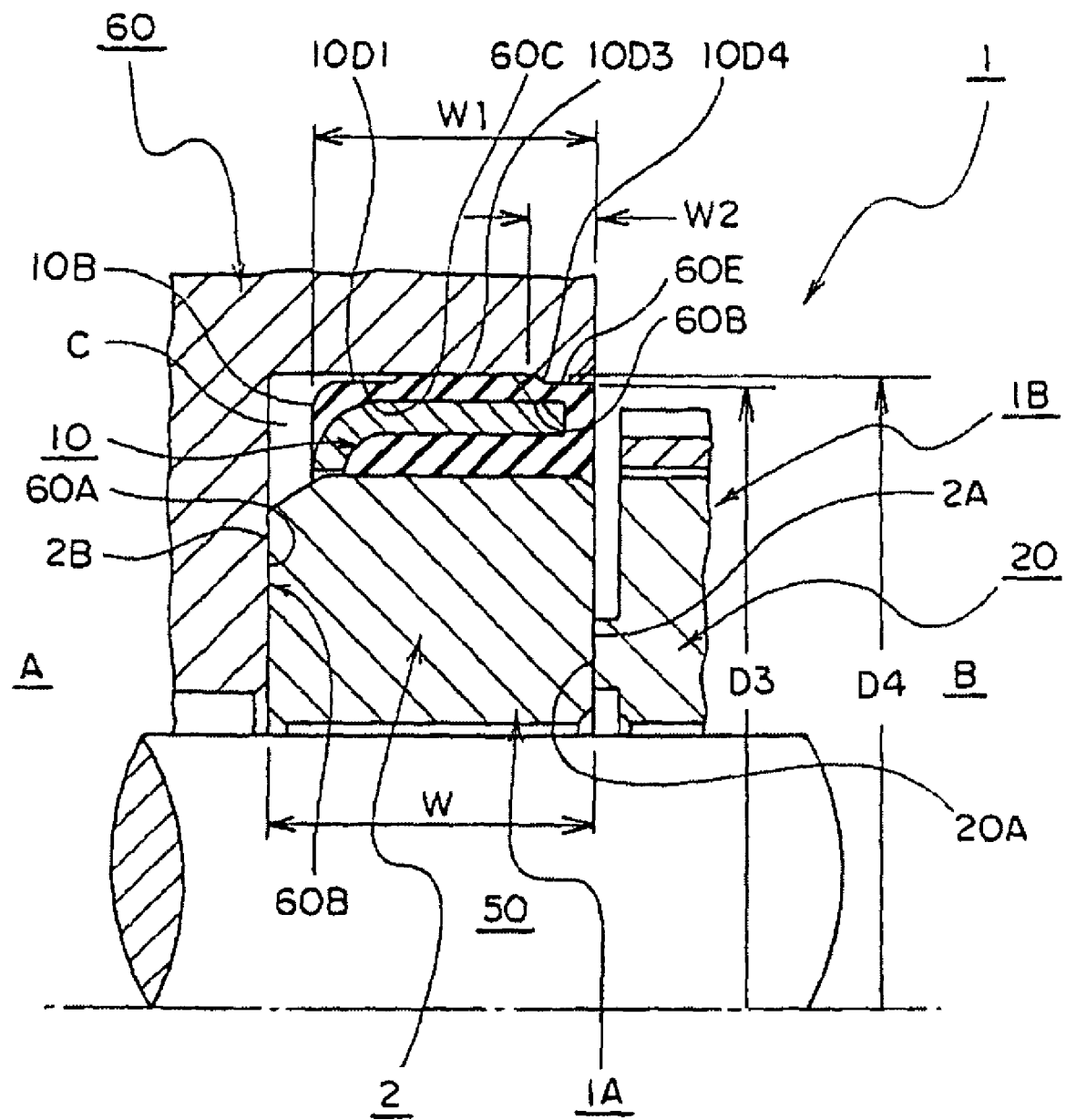
FIG. 5 is a half cut-away cross sectional view of a mechanical seal device installed in the shaft as a fourth embodiment related to the present invention.

FIG. 5 is a half cut-away cross sectional view of a mechanical seal device 1 as a fourth embodiment related to the present invention. What makes FIG. 5 different from the mechanical seal device 1 in FIG. 4 is that a locking step portion 60E is disposed on the fit engagement circumferential surface 60C of the seal housing 60. Also there is disposed a stopper portion 10D4 at the end of axially elongated protrusion portion 10D3 of the packing 10 which forms a locking relation with the locking step portion 60E. Other configurations in FIG. 5 are more or less the same as those in FIG. 4 as indicated by identical reference numerals. A mechanical seal device 1 thus configured, for example, is able to securely maintain a seal-tight contact between the support surface 60A and the back surface 2B even after a long term operation of the mechanical seal device 1 within a pressure rippling apparatus, Each second seal portion 1B in the mechanical seal device 1 related to the first embodiment through the fourth environment is arranged similarly to the second seal portion 1B given in FIG. 1.

Figure 6:
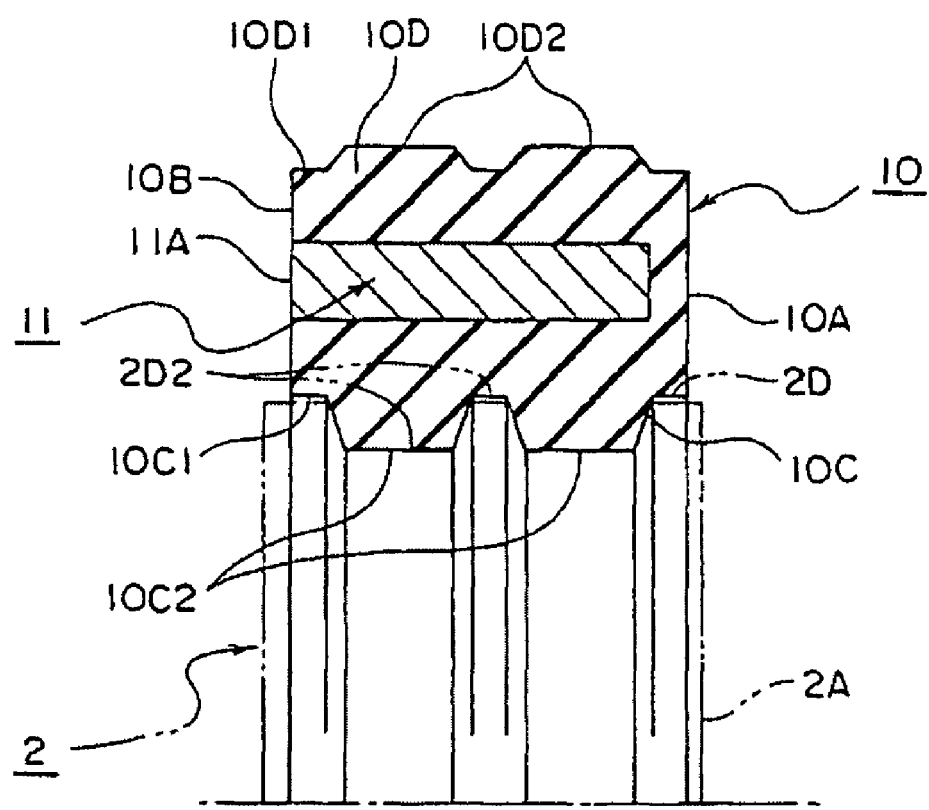
FIG. 6 is a half cut-away cross sectional view of a packing relative to a mechanical seal device of the present invention.

FIG. 6 is a half cut-away cross sectional view of a packing as one embodiment relative to the present invention. A reinforcement annulus 11 is immersed at the radial center of the packing 10. In this case, there are a plurality of projectional portions (seal portion) 10C2 disposed on an inner contact surface 10C1. of the first elastic layer 10C. The projectional portions 10C2 are press-fitted onto the secure engagement surface 2D of the stationary seal ring 2 for secure engagement. Or the secure engagement surface 2D of the stationary seal ring 2 retains stepped portion 2D2 which forms a locking relation with the projectional portion 10C2 for a locking engagement. This way makes the stationary seal ring 2 engage the packing 10 in a secure relation. Next, in case that thickness of the first elastic layer 10C is less than that of the second elastic layer 10D, the first elastic layer 10C which is first press-fitted to the secure engagement surface 2D of the stationary seal ring 2 can be fitted securely. In contrast, if the first elastic layer 10C is greater in thickness than the second elastic layer 10D, the stationary seal ring 2 and the packing 10 should preferably be integrated in a secure manner by means of adhesion or the like. Joining the stationary seal ring 2 with the packing 10 and plunging the insertion nose end portion 10B of the packing 10 into the cavity portion "C" induces elastic shear strains in the respective elastic layers 10C, 10D, which realizes a seal-tight contact between the support surface 60A and the back surface 2B.

With the foresaid individual embodiments of the invention, the heat generated during sliding motion of the stationary seal ring 2 is expected to be released by transferring to the seal housing 60 by way of the back surface 2B and the support surface 60A. As the result, the seal surface 2A of the stationary seal ring 2 is able to effectively prevent troubles such as crack, fracture and so on which are caused by slide friction heat generated thereat. Furthermore, weakening, decrease of elasticity or chemical transformation due to the friction heat can effectively be prevented. Also frictional heat generated in the seal surface 2A is effectively prevented from reducing the seal performance of the seal surface 2A after various types of sealed fluid thermally degraded or transformed to oil carbonized product get caught on the seal surface 2A.

Construction and operational effect of a mechanical seal device as inventions of other embodiments related to the present invention will be described below.

In a mechanical seal device of the first invention related to the embodiments of the present invention, the cavity portion is defined between the insertion nose end portion and the opposing surface located in the support surface side by arranging the axial length of the stationary seal ring longer than the axial length of the cylindrical packing.

According to the mechanical seal device of the first invention, the cavity portion is defined between the insertion nose end portion and the opposing surface by arranging the axial length of the stationary seal ring longer than the axial length of the cylindrical packing. Therefore, as the assembly of the stationary seal ring and packing can be provided as precisely as designed, the dimension of the cavity portion "C" can be formed as designed as well. At the same time, it is advantageous in that part management becomes straightforward. Also as the axial depth "X" of the cavity portion can arbitrarily be chosen by means of a relationship between the axial length of the stationary seal ring and the axial length of the packing, a state of elastic deformation of the second elastic layer is arranged as designed, hence an optimal contact force between the back, surface and the support surface. Besides, as sintering allows adjustment of the length of the stationary seal ring, there is no need of machining process for the cavity portion of the seal housing, hence reduction of the machining cost. In addition, there also exist advantages described earlier relative to the present invention.

In a mechanical seal device of the second invention related to the embodiments of the present invention, a cylindrical reinforcement annulus is immersed at a radially inbetween location in the packing.

According to the mechanical seal device of the second invention, the cylindrical reinforcement annulus is immersed in the packing. Therefore the reinforcement annulus enables a secure insertion of the packing between the stationary seal ring and the seal housing, and the elastic deformation of the second elastic layer plunged is provided a support by the reinforcement annulus for secure engagement between the second elastic layer and the fit engagement surface of the seal housing. And it is advantageous in that the back surface can maintain a contact with the support surface for a long period. Furthermore, a secure engagement of the second elastic layer in relation to the fit engagement surface due to elastic deformation thereof is assured of a coupling with a designed dimension.

In a mechanical seal device of the third invention related to the embodiments of the present invention, the insertion nose end surface of the reinforcement annulus immersed in the packing is aligned on more or less the same level as the insertion nose end surface.

According to the mechanical seal device of the third invention, the insertion nose end surface of the reinforcement annulus immersed in the packing is aligned on more or less the same level as the insertion nose end surface. Therefore, abutting the insertion nose end surface of the reinforcement annulus immersed in the packing against the opposing side wall of the cavity portion makes it possible to set elastic deformation of the first elastic layer and the second elastic layer as intended with considerations on spring-back thereof. It is also advantageous in that insufficient insertion of the packing between the stationary seal ring and the seal housing can be detected.

In a mechanical seal device of the fourth invention related to the embodiments of the present invention, the packing is arranged in such a way that the thickness of the first elastic layer located in the inner circumferential side of the reinforcement annulus is greater than the thickness of second elastic layer located in outer circumferential side thereof.

According to the mechanical seal device of the fourth invention, the packing is: arranged in such a way that the thickness of the first elastic layer located in the inner circumferential side of the reinforcement annulus is greater than the thickness of second elastic layer located in outer circumferential side thereof. With this arrangement, the first elastic layer undergoes a large elastic deformation (parallelogramatic cross section) while the second elastic layer a smaller elastic deformation than the first elastic layer, hence a secure engagement with the fit engagement surface of the seal housing (see FIG. 9 and FIG. 10)

In a mechanical seal device of the fifth invention related to the embodiments of the present invention, the secure engagement surface of the stationary seal ring and the adhesion surface of the packing are fixed with each other by means of a locking engagement of the stepped portion or an adhesive.

According to the mechanical seal device of the fifth invention, the secure engagement surface of the . stationary seal ring and the adhesion surface of the packing are fixed with each other by means of a locking engagement of the stepped portion or a press-contact of the stepped portion. With this arrangement, it is advantageous in that the stationary seal ring and the packing are securely made in contact with each other while the second elastic layer and the fit engagement surface of the seal housing are securely coupled, hence a secure contact between the back surface of the stationary seal ring and the support surface of the seal housing. As the result, prevention of axial displacement of the slide seal surface leads to an outstanding seal performance. At the same time, as the heat generated in the stationary seal ring in association with sliding movement can be released from the support surface, possible damages of the slide seal surface of the stationary seal ring due to slide friction heat can effectively be prevented.

INDUSTRIAL APPLICABILITY

As described so far a mechanical seal device of the present invention is advantageous in that the mechanical seal device prevents formation of crack or damage on the seal surface of the seal ring by releasing slide friction heat generated in the seal surface. The mechanical seal device is also advantageous in that durability of the packing is enhanced by preventing troubles in the packing which provides a seal for the seal ring.

The invention claimed is:

1. A mechanical seal assembly having a mechanical seal device and a seal housing that includes a step shouldered bore comprised of a fit engagement circumferential surface disposed in a bore hole of the seal housing receiving a rotary shaft therethrough, and a support surface perpendicular relative to said fit engagement circumferential surface, said mechanical seal device comprising:

an annular packing made of a resilient material and having a contact surface, an adhesion surface and an insertion nose end portion, said contact surface securely engaging said fit engagement circumferential surface, said adhesion surface being disposed at an inner circumferential side in relation to said contact surface, said insertion nose end portion located at a frontal tip in a direction of insertion against said fit engagement circumferential surface;

a cylindrical reinforcement annulus immersed at a radially inbetween location within said packing; and a stationary seal ring having a secure engagement surface, a back surface, and a seal surface, said secure engagement surface coupled with said adhesion surface of said packing, said back surface forming a seal-tight contact with said support surface, and said seal surface being disposed opposite said back surface, wherein a thickness of a first elastic layer located at an inner circumferential side of said reinforcement annulus immersed in said packing is greater than a thickness of a second elastic layer located at an outer circumferential side of said reinforcement annulus, said insertion nose end portion of said packing is slanted toward an opposing surface of the seal housing relative to an insertion nose end surface of said reinforcement annulus and said back surface abuts said support surface, a cavity portion (C) is defined radially between said insertion nose end portion and the opposing surface, and said back surface is in a seal-tight relation to said support surface by means of an elastic force of said packing.

2. A mechanical seal assembly as claimed in claim 1 wherein an axial length (W) of said stationary seal ring is greater than an axial length (W1) of said packing, and said cavity portion is created defined radially between said insertion nose end portion and the opposing surface in said support surface side.

3. A mechanical seal assembly as claimed in claim 1 wherein said insertion nose end surface of said reinforcement annulus is aligned substantially with an end surface of said insertion nose end portion of said packing, a cylindrical portion of a support ring having an "L"-shaped cross section is securely engaged with an inner circumferential surface of a through bore communicating into the step shouldered bore of the seal housing, and a side surface of a flange portion of the support ring abuts a radially formed surface of the step shouldered bore to define the cavity portion (C) by a thickness (X) of the flange portion of the support ring.

4. A mechanical seal assembly as claimed in claim 1 wherein said adhesion surface of said packing which forms a secure engagement with said secure engagement surface of said stationary seal ring retains an irregular surface, wherein said irregular surface and said secure engagement surface are coupled by means of press-adhesion contact or locking engagement of the stepped portion.

5. A mechanical seal assembly as claimed in claim 1 wherein an insertion nose end surface of said reinforcement annulus is aligned substantially with an end surface of said insertion nose end portion of said packing, and the opposing surface is recessed axially from the support surface near fit engagement circumferential surface to define the cavity portion (C) in the recessed opposing surface.

6. A mechanical seal assembly having a mechanical seal device and a seal housing that includes a step shouldered bore comprised of a fit engagement circumferential surface disposed in a bore hole of the seal housing receiving a rotary shaft therethrough, and a support surface perpendicular relative to said fit engagement circumferential surface, said mechanical seal device comprising:

an annular packing made of a resilient material and having a contact surface, an adhesion surface and an insertion nose end portion, said contact surface securely engaging said fit engagement circumferential surface, said adhesion surface being disposed at an inner circumferential side in relation to said contact surface, said insertion nose end portion located at a frontal tip in a direction of insertion against said fit engagement circumferential surface;

a cylindrical reinforcement annulus immersed at a radially inbetween location within said packing; and a stationary seal ring having a secure engagement surface, a back surface, and a seal surface, said secure engagement surface coupled with said adhesion surface of said packing, said back surface forming a seal-tight contact with said support surface, and said seal surface being disposed opposite said back surface, wherein a thickness of a first elastic layer located at an inner circumferential side of said reinforcement annulus immersed in said packing is greater than a thickness of a second elastic layer located at an outer circumferential side of said reinforcement annulus, said insertion nose end portion of said packing is pressed toward an opposing surface located at a radially outward portion of the support surface when said back surface abuts said support surface, a cavity portion (C) is defined radially between said insertion nose end portion and the opposing surface, said back surface is in a seal-tight relation to said support surface by means of an elastic force of said packing, and wherein an insertion nose end surface of said reinforcement annulus is aligned substantially with an end surface of said insertion nose end portion of said packing, a cylindrical portion of a support ring having an "L"-shaped cross section is securely engaged with an inner circumferential surface of a through bore communicating into the step shouldered bore of the seal housing, and a side surface of a flange portion of the support ring abuts a radially formed surface of the step shouldered bore to define the cavity portion (C) by a thickness (X) of the flange portion of the support ring.

7. The mechanical seal assembly as claimed in claim 6 wherein an axial length (W) of said stationary seal ring is greater than an axial length (W1) of said packing, and said cavity portion is defined radially between said insertion nose end portion and the opposing surface in said support surface side.

8. The mechanical seal assembly as claimed in claim 6 wherein said adhesion surface of said packing which forms a secure engagement with said secure engagement surface of said stationary seal ring retains an irregular surface, wherein said irregular surface and said secure engagement surface are coupled by means of press-adhesion contact or locking engagement of the stepped portion.

9. A mechanical seal assembly as claimed in claim 6 wherein an insertion nose end surface of said reinforcement annulus is aligned substantially with an end surface of said insertion nose end portion of said packing, and the opposing surface is recessed axially from the support surface near fit engagement circumferential surface to define the cavity portion (C) in the recessed opposing surface.

* * * * *